2,865,802
PESTICIDES

Abraham Bavley, Brooklyn, and Donald P. Cameron, Bronx, N. Y., assignors to Chas. Pfizer & Co., Inc., Brooklyn, N. Y., a corporation of Delaware No Drawing. Application July 2, 1957
Serial No. 669,421

6 Claims. (Cl. 167—22)

This invention is concerned with a new and useful class of pesticides particularly useful as acaricidal agents (miticidal agents). More particularly it is concerned with certain 1,2-dicarbo-(2-dialkylthionophosphonothioethoxy)-3-dialkylthionophosphonothiopropanes and 1,2-dicarbo-(3-dialkylthionophosphonothiopropoxy) - 3 - dialkythiono-phosphonothiopropanes which have been found to be useful as pesticidal agents.

The wide-spread and effective use of insecticides has given rise to a new problem, that is the control of mites. The removal of insects, particularly of insects which are the natural enemies of mites, has progressed to the point where various species of mites formerly considered serious pests only occasionally, or in restricted areas, have caused grave injury each season to many economically important crops. The compounds of this invention are unusually effective in the control of mites.

These compounds are represented by the following structural formula:

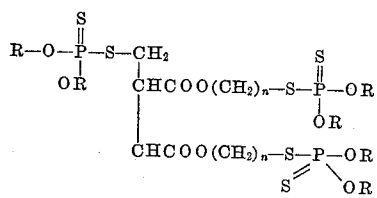

wherein $n$ is one of the integers two and three, and R is an alkyl group containing up to four carbon atoms.

The choice of starting compounds used in the preparation of the products of this invention will depend upon whether it is desired to prepare a compound wherein $n$ is two or three, that is whether it is desired to prepare an ethoxy or a propoxy compound. For the preparation of an ethoxy derivative, the most desirable starting compound is a 1,2-dicarbo-bis(2-haloethoxy)-propene-2 or a 1,2-dicarbo-bis-(2-haloethoxy)-3-dialkylthionophosphonothiopropane the alkyl groups in the latter compound being the same as described above. For the preparation of the propoxy derivative, the most desirable compound is a 1,2-dicarboallyloxy-propene-2.

The above starting compounds as used in the preparation of the products of this invention can be readily prepared. The β-haloethoxy compounds can be prepared by the reaction of a halohydrin, for example chlorohydrin with either 1,2-dicarboxy-propene-2 or the chosen 1,2-dicarboxy - 3 - dialkylthionophosphonothiopropane using conventional Fischer esterification procedures. The latter compound is prepared by the reaction between 1,2-dicarboxy-propene-2 anhydride and the appropriate dialkyldithiophosphoric acid. Fischer esterification can be similarly employed for the preparation of allyl esters by the reaction of allyl alcohol with 1,2-dicarboxy-propene-2.

For the preparation of 1,2-dicarboxy-3-dialkylthionophosphonothiopropane, the appropriate dialkyldithiophosphoric acid is contacted with 1,2-dicarboxypropene-2 anhydride at a temperature of from about 20° C. to about 150° C. during a period of from about one-half to about forty-eight hours either with or without a solvent. The resulting addition compound is hydrolyzed to the dicarboxy acid under standard conditions with either acid or basic catalyst.

Suitable solvents for the formation of the addition product include low molecular weight alkanols such as methanol, ethanol, propanol, glycol, glycerol and the like; low molecular weight ketones such as acetone, methyl ethyl ketone, methyl isobutyl ketone, acetophenone, cyclohexane and the like; aliphatic esters such as ethyl acetate, methyl propionate and the like; dialkylphosphates such as triethylphosphate and triisopropylphosphate; ethers such as ethyl ether, butyl ether and dioxane; aromatic hydrocarbon solvents such as benzene, toluene, xylene and the like, nitro aromatic hydrocarbon solvents such as nitrobenzene; halogenated hydrocarbon solvents such as chlorobenzene, chloroform and carbon tetrachloride; dimethyl formamide and dimethyl sulfoxide.

It is preferred to carry out the reaction at from about 20° C. to about 40° C. for from about thirty-six to about forty-eight hours since these conditions usually give the best yields.

The reaction is often aided by the presence of a polymerization inhibitor such as hydroquinone, and from 0.1% to 2.5% by weight of a nitrogenous base such as pyridine, dimethyl aniline, trimethyl amine or other obvious equivalents, although these additions are not absolutely necessary.

A metathetical reaction between an ammonium or metallic salt of a dialkyldithiophosphoric acid, preferably the ammonium or alkali metal salt and a 1,2-dicarbo-bis- (2 - haloethoxy) - 3 - dialkylthionophosphonothiopropane provides the valuable compounds of this invention. Alternatively, the metathetical reaction between the metallic salt of a dialkyldithiophosphoric acid and 1,2-dicarbo-bis- (2-haloethoxy)-propene-2 can be used to provide a 1,2-dicarbo-2-dialkylthionophosphonothio - ethoxy-propene-2, and this in turn can be converted to a 1,2-dicarbo-(2-dialkylthionophosphonothio-ethoxy) - 3 - dialkylthionophosphonothiopropane in accordance with the description given above for the addition of a dialkyl-dithiophosphoric acid to 1,2-carboxy-propane-2.

The reaction is conveniently carried out by contacting the chosen β-haloethoxy compound with the chosen salt in a lower aliphatic, oxygenated solvent such as the lower alkanols or ketones containing up to six carbon atoms at a temperature of from about 60° C. to about 150° C. for a period of from about fifteen minutes to about six hours. It may be advantageous to use as much as fifty percent excess or even more of the dialkyldithiophosphoric acid to insure high yields, but it is not necessary to do so, since an equivalent quantity of the acid provides quite good yields. It is most convenient to select a solvent which, at atmospheric conditions, boils within the preferred temperature range of from about 80° C. to about 110° C. and to reflux the mixture for the preferred reaction period of from about thirty minutes to about two hours. During the reaction period, the by-product inorganic salt, for example sodium chloride usually precipitates from the mixture and this can be removed by filtration.

The valuable product can be recovered in any convenient manner, for example solvent extraction or removal of the solvent in vacuo. The compounds of this invention are so active as pesticidal agents that it is not necessary to use them in a highly purified form. Therefore, in most instances, the product will be recovered simply by removing the solvent in vacuo. It may be desirable to filter the residue before use to remove the last traces of inorganic salt.

If a highly purified product is desired this can be readily obtained. For example, the less pure product can be taken up in a water immiscible solvent or a mixture of solvents, say for example aliphatic or aromatic hydrocarbon solvents containing up to ten carbon atoms or a mixture of these with dialkyl ethers containing up to eight carbon atoms. The solution is then washed with water, dried and the solvent removed in vacuo. The residue from the washed solution can be further purified by conventional means such as recrystallization or vacuum distillation.

A propoxy derivative of this invention can be prepared by reaction between a 1,2-dicarboallyloxy-propene-2 and a dialkyldithiophosphoric acid. This reaction is carried out by contacting the allyloxy compound with at least an equivalent proportion of the chosen dialkyldithiophosphoric acid in an inert organic solvent, for example lower aliphatic or aromatic hydrocarbon solvents containing up to ten carbon atoms and their halogenated analogs, at a temperature of from about 60° C., to about 180° C. for from about six to about thirty-six hours. Suitable solvents include heptane, octane, benzene, toluene, the xylenes, chloroform, carbon tetrachloride, chlorobenzene, etc. It is most convenient to select a solvent which, under atmospheric conditions, hails within the preferred temperature range of from about 80° C. to about 120° C., and to reflux the mixture for the preferred time of from about sixteen to about thirty hours.

The product can be recovered from the reaction mixture by any convenient method. As with the ethoxy analogs, the propoxy compounds are so active that it is not necessary to employ the highly purified compounds, and again the compound will most often be isolated by removing the solvent in vacuo. It is best to neutralize any excess acid by washing the reaction mixture with an aqueous alkaline reagent, for example the hydroxides, carbonates or bicarbonates of the alkali or alkaline earth metals, prior to removing the solvent. The neutralization is usually preceded and followed by an aqueous wash. The reaction mixture is best dried before stripping the solvent in vacuo, and this can be accomplished by the use of an anhydrous drying agent, such as sodium or magnesium sulfate. It may be convenient to choose a solvent which forms an azeotropic mixture with water, and to dry the reaction mixture by azeotropic distillation.

The highly purified product can be obtained by the same procedure used for preparing the purified ethoxy analog.

In carrying out the above described reaction it may be advantageous to use as much as a fifty percent excess, or even more, of the dialkyldithiophosphoric acid to insure high yields, but it is not necessary to do so since an equivalent quantity of the acid provides quite good yields.

As stated above, the compounds of this invention are valuable in combating insects, particularly mites. For the purpose of combating insects the compound may be used alone or dispersed in a suitable extending agent. One particularly effective manner of applying the miticidal agents of this invention is to suspend the chosen compound in a 5% acetone-water solution and to apply the mixture in the form of a spray. Mixtures of this type containing as little as 60 parts per million are effective in combating Tetranychus bimaculata, commonly known as the two-spotted spider mite. This particular mite causes extensive damage to both hothouse and open air crops. It is a general feeder but is particularly troublesome to cucumbers, tomatoes, roses, chrysanthemums, fuchsias and argenatums. It is a major problem on roses. When it is not controlled it limits production of edible crops and makes flowers unsalable. It has become increasingly prevalent in orchards, particularly in those areas which have been extensively treated with common insecticides.

Mites present a peculiar control problem. Their life cycle is so short that there is nearly always a sufficiently high proportion of the population in the egg stage to render miticides which are effective only against the nymph or adult stage of the mite unsatisfactory. Thus, a miticide which is lethal only towards nymph and adult mites does not give complete control, since the eggs which have not hatched, will hatch and the mite will mature after the miticide has disappeared from the plant. It is a particular attribute of the compounds of this invention that they are active against all stages of the mite life cycle, including the egg.

Although the active agents of this invention can be used alone, it is more economical to use them in a dispersed form in a suitable extending agent.

In this disclosure and in the claims appended thereto, the term, "dispersed" is used in its widest possible sense. When it is said that the compounds of this invention are dispersed it means that the particles may be molecular in size and held in true solution in a suitable solvent. It means further, that the particle may be colloidal in size and dispersed through a liquid phase in the form of suspension or emulsions or in the form of particles held in suspension by wetting agents. It also includes particles which are dispersed in a semi-solid viscous carrier such as petrolatum or soap in which they may be actually dissolved in the carrier or held in suspension in the carrier with the aid of suitable emulsifying or wetting agents. The term, "dispersed" also means that the particles may be mixed with and spread throughout a solid carrier so that the mixture is in the form of powder or dust. The term, "dispersed" also includes mixtures which are suitable for use as aerosols including solutions, suspensions or emulsions of the agent of this invention in a carrier such as Freon which boils below room temperature at ordinary pressure.

The term, "extending agent" as used in this disclosure, and in the appended claims, includes any and all of those agents in which the compounds of the instant invention are dispersed. It includes, therefore, the solvents of a true solution, the liquid phase of suspensions, emulsions or aerosols, the semi-solid carrier of ointments and the solid phase of dust and powders.

It has been found that the compounds of this invention are active when dispersed in an extending agent at concentrations of 0.001 percent by weight or even lower. This concentration is effective when the dispersing agent is a liquid but it is preferred to use more concentrated mixtures when the dispersing agent is a semi-solid or a solid. This is because liquid dispersions which are, of course, suitable for use as sprays give a more intimate contact with the mites than the solid dispersions and, therefore, lower concentrations are more effective with liquid dispersions.

There are a number of solvents which can be utilized for the preparation of solutions, suspensions or emulsions of the compounds of this invention. High boiling oils of vegetable origin such as castor oil or olive oil have been found to be suitable. Low boiling, more volatile solvents such as acetone, cyclohexanone, carbon tetrachloride, ethylene dichloride, tetrachloroethane, hydrogenated naphthalenes, alkylated naphthalenes, solvent naphtha and the like are also useful. Petroleum fractions, particularly kerosene, are especially useful. For certain applications it may be advantageous to resort to mixtures of solvents.

If the active agents are to be applied as aerosols it is convenient to dissolve them in a suitable solvent and to disperse the resulting solution in a liquid such as Freon which boils below room temperature. For such applications it is better to employ true solutions of the active agent although it is possible to employ suspensions or emulsions of the active agent.

The agents of this invention are often dispersed either in the form of emulsions or suspensions, in an inert carrier such as water with the aid of a capillary active substance. Such capillary substances may be anion-active, cation-active or non-ionizing. There may be mentioned by way of example natural or synthetic soaps, Turkey-red oil, fatty alcohol sulfonates, esters of fatty acids and the like. Other examples include high molecular weight quaternary ammonium compounds as well as condensation products of ethylene and propylene oxide with monohydric and polyhydric alcohols.

For use as a powder or dust the active ingredients of this invention are mixed with any of a number of extending agents either organic or inorganic in nature which are suitable for the manufacture or pulverulent preparations. This includes, for example, tricalcium phosphate, calcium carbonate, kaolin, bole, kieselguhr, talcum, calcined magnesia, boric acid and others. Materials of vegetable origin such as powdered cork, powdered wood and powdered walnut shells are also useful. These mixtures may be used in the dry form, or by the addition of wetting agents, the dry powder can be rendered wettable by water so as to obtain stable aqueous dispersions suitable for use as sprays.

For special purposes the agents of this invention can be worked into the form of a paste or an ointment by the use of such semi-solid extending agents as soap or petroleum jelly with or without the aid of solubility promoters and/or dispersing agents.

In all of the forms described above the dispersions may be provided ready for use or they may be provided in a concentrated form suitable for mixing with other extending agents before use.

In all of these various dispersions the active pesticidal agents can be one of or a plurality of the compounds of our invention. The compounds may also be advantageously employed in combination with other pesticides including for example, insecticides, fungicides and bactericides. There may be mentioned by way of example, 1,1 - bis - (p - chlorophenyl) - 2,2,2 - trichloroethane (DDT); the gamma isomer of benzene hexachloride; 2,2 - bis - (p-methoxyphenyl) - 1,1,1 - trichloroethane (DMOT); or inorganic compounds such as salts of mercury, copper or arsenic, as well as finely divided sulphur. In this manner it is possible to obtain mixtures which are effective against a wide variety of pests.

The following examples are given by way of illustration only and are not to be construed as limitations of this invention, many variations of which are possible without departing from the spirit or scope thereof.

EXAMPLE I

*1,2-dicarbo-(2-dimethylthionophosphonothio)-ethoxy-3-dimethylthionophosphonothiopropane*

To a stirred solution of 0.1 mole of ammonium dimethyldithiophosphate in 80 ml. of methanol was added over 0.5 hour, 0.4 mole of 1,2-dicarbo-bis-(2-chloroethoxy) - 3 - dimethylthionophosphonothiopropane while maintaining the solution at the reflux temperature. Refluxing was continued for two hours, and at the end of this period precipitated ammonium chloride was removed by filtration. The filtrate was concentrated in vacuo at room temperature. The residue was taken up in 100 ml. of benzene and the resulting solution washed twice with 25 ml. portions of water. The organic layer was separated and dried over magnesium sulfate. The drying agent was removed by filtration and the dried filtrate concentrated at 0.5 mm. of mercury for twelve hours at room temperature to leave the desired product as a residue.

EXAMPLE II

*1,2-dicarbo-(2-diethylthionophosphonothio)-ethoxy diethylthionophosphonothiopropane*

To a stirred solution of 0.1 mole of barium diethyldithiophosphate in 25 ml. of ethanol was added, over 0.25 hour, 0.23 mole of 1,2-dicarbo-bis-(2-bromoethoxy)-propane-2 while maintaining the solution at the reflux temperature. Refluxing was continued for one hour and at the end of the period precipitated barium bromide was removed by filtration. The filtrate was concentrated in vacuo at room temperature. The residue was taken up in 100 ml. of benzene containing 25 ml. of diethyl ether and the resulting solution washed twice with 25 ml. portion of water. The organic layer was separated and dried over sodium sulfate. The drying agent was removed by filtration and the dried filtrate concentrated at 0.5 mm. of mercury for twelve hours at room temperature to leave the desired product as a residue.

The compound 1,2-dicarbo-(2-diethylthionophosphonothio)-ethoxy-propane-2 (0.1 mole) was taken up in 100 ml. of benzene containing 0.2 mole of diethyldithiophosphoric acid, and the mixture refluxed for twenty-four hours. It was cooled and concentrated in vacuo at room temperature to a viscous liquid residue. The residue was taken up in 150 ml. of benzene, washed once with 50 ml. of water, three times with 50 ml. portions of 10% sodium bicarbonate and again with a 50 ml. portion of water. The organic layer was separated and dried over anhydrous sodium sulfate, filtered and concentrated at 5 mm. of mercury for twelve hours at room temperature to leave the desired product as a residue.

The same procedure was used to prepare 1,2-dicarbo- (2 - dimethyl - thionophosphonothio) - ethoxy - 3 - diethylthionophosphonothiopropane from barium dimethyldithiophosphate; 1,2 - dicarbo - bis - (2 - bromoethoxy)- propane-2 and diethyldithiophosphoric acid.

EXAMPLE III

*1,2-dicarbo-(2-di-n-butylthionophosphonothio)-ethoxy-3-di-n-butylthionophosphonothiopropane*

To a stirred solution of 0.1 mole of ammonium di-n-butyldithiophosphate in 80 ml. of ethanol was added over 0.25 hour, 0.4 mole of 1,2-dicarbo-bis-(2-chloroethoxy)- 3-di-n-butylthionophosphonothiopropane while maintaining the solution at the reflux temperature. Refluxing was continued for two hours, and at the end of this period precipitated ammonium chloride was removed by filtration. The filtrate was concentrated in vacuo at room temperature. The residue was taken up in 100 ml. of benzene and the resulting solution washed twice with 25 ml. portions of water. The organic layer was separated and dried over magnesium sulfate. The drying agent was removed by filtration and the dried filtrate concentrated at 0.5 mm. of mercury for twelve hours at room temperature to leave the desired product as a residue.

The same procedure was used to prepare 1,2-dicarbo- (2 - dipropylthionophosphonothio) - ethoxy - 3 - dipropylthionophosphonothiopropane from ammonium dipropyldithiophosphate and 1,2 -dicarbo - bis - (2 - chloroethoxy) - 3 - dipropylthionophosphonothiopropane.

EXAMPLE IV

*1,2-dicarbo-(3-dimethylthionophosphonothio)-propoxy-3-dimethylthionophosphonothiopropane*

1,2-dicarboallyloxy-propane-2 (0.1 mole) in 100 ml. of benzene plus 0.4 mole of dimethyldithiophosphoric acid was heated under reflux for twenty-four hours. It was cooled and concentrated in vacuo at room temperature. The residue was taken up in 150 ml. of benzene, washed once with 50 ml. of water, three times with 50 ml. portions of 10% sodium carbonate and again with a 50 ml. portion of water. The organic layer was separated and dried over anhydrous sodium sulfate, filtered and concentrated at 5 mm. of mercury for twelve hours at room temperature to leave the desired product as a residue.

The same procedure was used to prepare 1,2-dicarbo- (3 - diethylthionophosphonothio) - propoxy - 3 - diethylthionophosphonothiopropane using 0.5 mole of diethyldithiphosphoric acid and 0.1 mole of 1,2-dicarboallyloxy-propane-2 in refluxing benzene.

It was similarly employed in the preparation of 1,2-dicarbo - (3 - di - n - butylthionophosphonothio) - propoxy- 3 - di - n- butylthionophosphonothiopropane usign 0.1 mole of 1,2-dicarboallyloxy-propane-2 and 0.4 mole of di-n-butyldithiophosphoric acid in refluxing benzene.

What is claimed is:
1. A compound of the formula

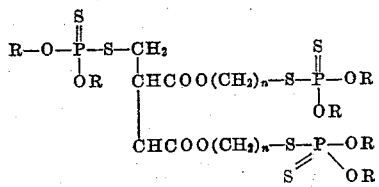

wherein $n$ is one of the integers two and three and R is an an alkyl group containing up to four carbon atoms.

2. A pesticidal composition containing as its principal active ingredient a compound of claim 1 dispersed in an extending agent.

3. A pesticidal composition containing as its principal active ingredient a compound of claim 1 dispersed in a solid extending agent.

4. A pesticidal composition containing as its principal active ingredient a compound of claim 1 dispersed in a semi-solid extending agent.

5. A pesticidal composition containing as its principal active ingredient a compound of claim 1 dispersed in a liquid extending agent.

6. A method of killing mites which comprises contacting said mites with a compound of claim 1.

References Cited in the file of this patent

UNITED STATES PATENTS

| | | |
|---|---|---|
| 2,710,301 | Morris et al. | Sept. 30, 1955 |
| 2,791,574 | Lanham | May 7, 1957 |